(12) United States Patent
Fukui

(10) Patent No.: US 8,714,624 B2
(45) Date of Patent: May 6, 2014

(54) BELT MOLDING FOR VEHICLE DOOR

(71) Applicant: Shiroki Corporation, Kanagawa (JP)

(72) Inventor: Katsuhisa Fukui, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 0 days.

(21) Appl. No.: 13/909,134

(22) Filed: Jun. 4, 2013

(65) Prior Publication Data

US 2013/0270855 A1  Oct. 17, 2013

Related U.S. Application Data

(63) Continuation of application No. PCT/JP2011/077137, filed on Nov. 25, 2011.

(30) Foreign Application Priority Data

Dec. 6, 2010 (JP) .................................. 2010-271296

(51) Int. Cl.
*B60R 13/04* (2006.01)

(52) U.S. Cl.
USPC ....................................................... 296/146.1

(58) Field of Classification Search
USPC ................................ 296/146.1, 146.2; 49/502
See application file for complete search history.

(56) References Cited

U.S. PATENT DOCUMENTS

| | | | |
|---|---|---|---|
| 5,799,442 A | 9/1998 | Takahashi et al. | |
| 7,390,050 B2 * | 6/2008 | Nakao et al. | 296/146.1 |
| 2004/0094989 A1 * | 5/2004 | Matsumoto et al. | 296/146.1 |
| 2007/0278827 A1 | 12/2007 | Nakao et al. | |

FOREIGN PATENT DOCUMENTS

| | | |
|---|---|---|
| EP | 0401090 A1 | 12/1990 |
| JP | 59-94948 | 6/1984 |
| JP | 9-123757 A | 5/1997 |
| JP | 2007290667 A | 11/2007 |
| JP | 4235655 B2 | 3/2009 |

OTHER PUBLICATIONS

English Translation Abstract for EP0401090A1 dated Dec. 5, 1990.
English Translation Abstract for JP4235655B2 dated Mar. 11, 2009.
English Translation Abstract for JPH09123757A dated May 13, 1997.
English Translation Abstract for JP2007290667A dated Nov. 8, 2007.

* cited by examiner

*Primary Examiner* — Lori Lyjak
(74) *Attorney, Agent, or Firm* — Millen, White, Zelano & Branigan, P.C.

(57) ABSTRACT

The belt molding body includes a vehicle exterior-side portion which faces a pillar and an upper edge of an outer panel from the vehicle exterior side; a vehicle interior-side portion, an entire end face of the vehicle interior-side portion being positioned between a pair of pillars as a receded end face; and an engaged portion formed on an inner surface of the belt molding body. The end cap includes a covering end which covers an end face of the vehicle exterior-side portion, an insertion portion extending from the covering end to a position in front of the receded end face, and an engaging portion formed on a vehicle exterior-side surface of the insertion portion and engaged with the engaged portion to prevent the end cap from moving toward the vehicle interior.

4 Claims, 6 Drawing Sheets

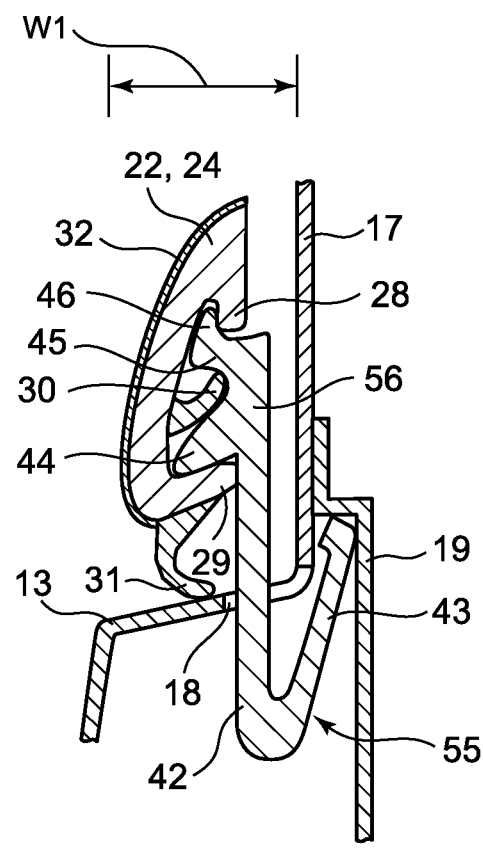

BELT MOLDING FOR VEHICLE DOOR

RELATED APPLICATION DATA

This is a continuation of International Application No. PCT/JP2011/077137, with an international filing date of Nov. 25, 2011, which is herein incorporated by reference in its entirety.

TECHNICAL FIELD

The present invention relates to a belt molding which is fixed to an upper edge of an outer panel of a vehicle door.

BACKGROUND ART

A vehicle door disclosed in Patent Literature 1 is provided with an outer panel, which constitutes an external surface of a door panel, and front and rear pillars (door frame) which are fixed to an inner surface of the outer panel and extend upward from an upper edge of the outer panel, and a belt molding made of resin which is a long member extending in the same direction as the aforementioned upper edge is mounted to this upper edge.

This belt molding is provided with a belt molding body (molding body) which is a substantially cylindrical (having a substantially inverted U-shaped in cross section) long member, both ends of which are open, and is further provided with end caps (mounters) which respectively close the openings at both ends of the belt molding body.

The belt molding body is provided with an upper-end connecting portion, a vehicle exterior-side portion which extends downward from a vehicle exterior-side edge of the upper-end connecting portion, a vehicle interior-side portion which extends downward from a vehicle interior-side edge of the upper-end connecting portion, and a lip(s) (squeegee portion(s)) provided on a vehicle interior-side surface of the vehicle interior-side portion. The belt molding body has a structure such that lower portions of both the front and rear ends of the vehicle interior-side portion and the rear end of the lip are cut off after the belt molding body is molded into a long member, having a uniform cross section, by extrusion molding.

Each end cap is provided with a cap portion and an insertion portion (mounting portion) which extends parallel to the aforementioned upper edge of the outer panel. Inserting the insertion portion into the internal space of the belt molding from an end-face opening thereof causes the vehicle exterior-side portion and the vehicle interior-side portion to be respectively positioned on both sides of the insertion portion, and accordingly, the insertion portion does not rattle relative to the belt molding body in either direction toward the vehicle exterior or interior. In addition, the internal space of the belt molding body is not exposed because the cap portions close the openings at both ends of the belt molding body.

When the belt molding that is assembled in such a manner is placed over the upper edge of the outer panel from above, the upper-end connecting portion is positioned right above the upper edge of the outer panel, the vehicle exterior-side portion is positioned on the vehicle exterior side of the aforementioned upper edge, the vehicle interior-side portion is positioned on the vehicle interior-side of the aforementioned upper edge, the lip comes in contact with the vehicle exterior-side surface of a door pane while being elastically deformed, and both the front and rear ends of the vehicle interior-side portion face the front and rear pillars, respectively.

CITATION LIST

Patent Literature

Patent Literature 1: Japanese Patent Publication No. 4,235,655

SUMMARY OF THE INVENTION

Technical Problem

Since portions of the lip at both the front and rear ends of the belt molding body are cut off, both the front and rear ends of the belt molding body have smaller dimensions in the vehicle width direction (dimensions in the direction of the door thickness) than the other portion of the belt molding body at which the lip remains attached. However, since the vehicle interior-side portion (the upper portion thereof) remains at both the front and rear ends of the belt molding body, if the offset amount of the pillars relative to the outer panel in the vehicle width direction (the distance between the upper edge of the outer panel and the pillars in the vehicle width direction) is small, both the front and rear ends of the vehicle interior-side portion interfere with the pillars, which makes it impossible to fix the belt molding to the vehicle door.

On the other hand, if both the front and rear ends of the vehicle interior-side portion are totally cut off from the belt molding body, both the front and rear ends of the belt molding body become small in dimensions in the vehicle width direction by that amount, which makes it possible to install the belt molding also to a vehicle door in which the pillars are offset by a small amount relative to the outer panel. However, since totally cutting off both the front and rear ends of the vehicle interior-side portion eliminates the member which prevents the insertion portion from rattling toward the vehicle interior, the insertion portion rattles relative to the belt molding body in the direction toward the vehicle interior.

If a belt molding which includes portions corresponding to the belt molding body and the end caps is molded as an integral part by injection molding, the structure of this belt molding becomes such that the end caps (portions corresponding to the end caps) do not rattle toward the vehicle interior, which makes it possible to eliminate both the front and rear ends of the vehicle interior-side portion. However, the shortcomings of a belt molding being formed by injection molding are a higher production cost than the belt molding (belt molding body) obtained by extrusion molding and having an unattractive appearance.

SUMMARY OF INVENTION

The present invention provides a vehicle door belt molding, a portion of which that faces a pillar can be narrowed in width in the vehicle width direction even when the belt molding body is formed by employing extrusion molding, and which can further prevent the end cap(s) from rattling toward the vehicle interior.

The present invention is characterized by a vehicle door belt molding including a belt molding body shaped into a long member which is fixed to an upper edge of a vehicle door and extends along the upper edge, and an end cap which can be detachably attached to an end-face opening of the belt molding body, wherein a pair of pillars which project upward from the upper edge of the vehicle door are fixed to a vehicle interior-side surface of an outer panel of the vehicle door, the belt molding body including a vehicle exterior-side portion which faces the upper edge and the pillars from a vehicle exterior side in a direction of thickness of the vehicle door; a vehicle interior-side portion which faces the upper edge from a vehicle interior-side in the direction of thickness of the vehicle door, wherein at least one end face of the vehicle interior-side portion, with respect to a lengthwise direction of the belt molding body, is entirely formed as a receded end face positioned between the pair of pillars; and an engaged portion which is formed on an inner surface of the belt molding body and positioned on a vehicle exterior side of the pillars. The end cap comprises a covering end which covers an end face of the vehicle exterior-side portion in a same direction as that of the receded end face; an insertion portion which extends from the covering end to a point in front of the receded end face and is positioned between the vehicle exterior-side portion and the vehicle interior-side portion as viewed in the lengthwise direction; and an engaging portion which is formed on a vehicle exterior-side surface of the insertion portion and engaged with the engaged portion to prevent the end cap from moving toward the vehicle interior-side.

The engaged portion includes a protrusion which extends upward or downward from a vehicle interior-side surface of the vehicle exterior-side portion, and the engaging portion includes a protrusion which is positioned in a clearance between the vehicle interior-side surface of the vehicle exterior-side portion and the engaged portion to be engaged with a vehicle exterior-side surface of the engaged portion.

The engaged portion includes a protrusion which extends downward from the vehicle interior-side surface of the vehicle exterior-side portion. Forming the engaged portion into such a protrusion improves the rigidity of the belt molding body.

The engaged portion is positioned closer to the vehicle exterior side than the upper edge of the outer panel.

The belt molding body includes an upper-end connecting portion which is positioned directly above the upper edge and which connects upper edges of the vehicle exterior-side portion and the vehicle interior-side portion to each other. The engaged portion is provided on a curved portion which connects a lower surface of the upper-end connecting portion with the vehicle interior-side surface of the vehicle exterior-side portion.

The vehicle exterior-side surface of the engaged portion includes a flat surface orthogonal to a vehicle width direction.

Advantageous Effects of the Invention

In the present invention, an end face of the vehicle interior-side portion in the lengthwise direction of the belt molding body is entirely formed as the receded end face, in other words, an end portion of the vehicle interior-side portion is entirely omitted, which shortens the size of the end portion of the vehicle interior-side portion in the vehicle width direction. Accordingly, the belt molding according to the present invention can also be installed to a vehicle door in which the pillars are offset by a small amount relative to the outer panel in the vehicle width direction.

In addition, although the vehicle interior-side portion of the belt molding body does not exist on the vehicle interior-side of the insertion portion of the end cap, the end cap does not rattle toward the vehicle interior because the engagement between the engaged portion that is provided on the vehicle exterior side of the belt molding body and the engaging portion that is provided on the insertion portion of the end cap prevents the end cap from moving toward the vehicle interior.

BRIEF DESCRIPTION OF THE DRAWINGS

FIG. 9 is a cross sectional view, similar to that of FIG. 4, of the same modified embodiment.

DESCRIPTION OF THE EMBODIMENTS

Figure 1:
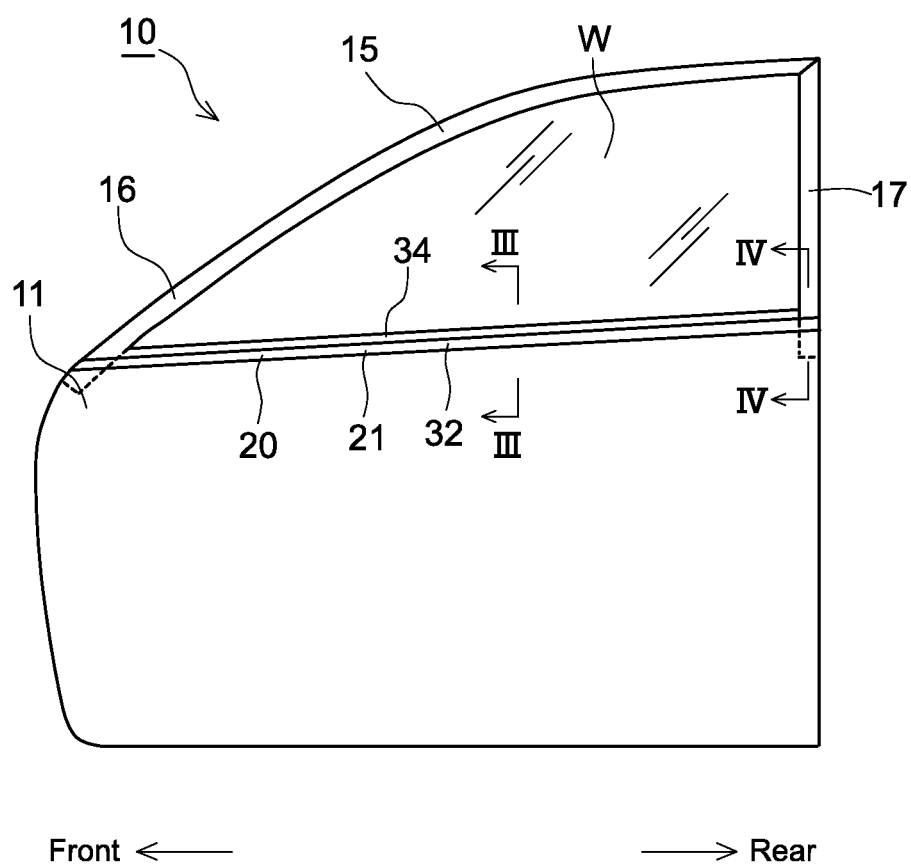
FIG. 1 is a side elevational view of an embodiment of a vehicle door according to the present invention, viewed from the vehicle exterior side.
Figure 2:
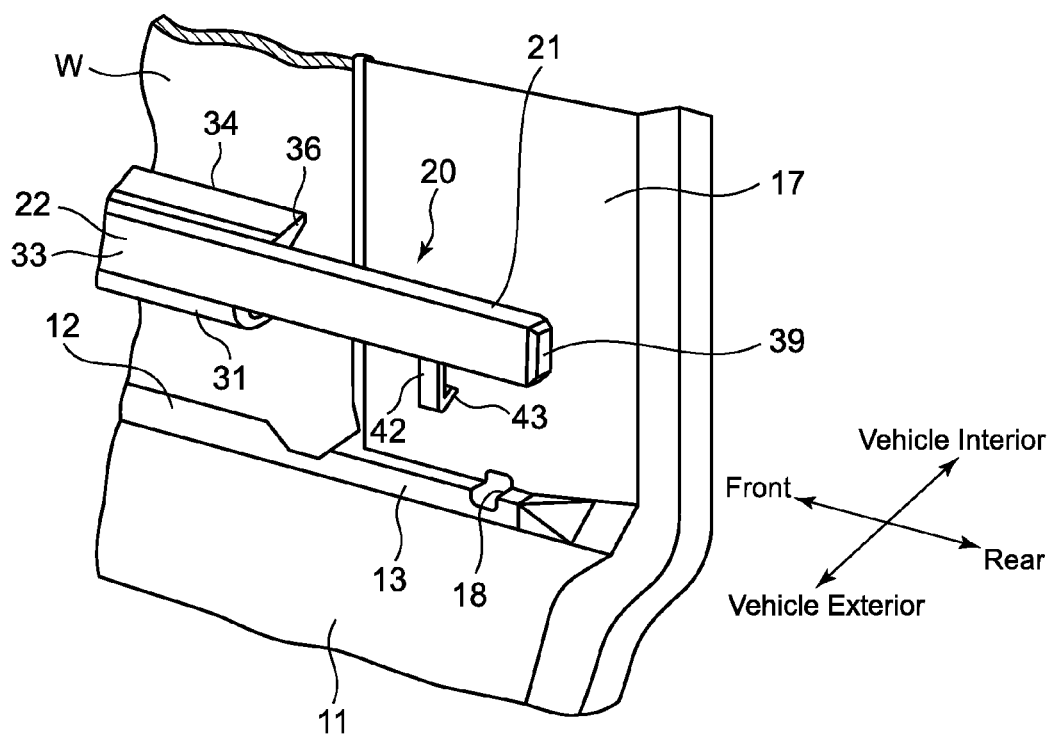
FIG. 2 is a perspective view of a main part of the vehicle door in a state where a belt molding is separated therefrom.

An embodiment of the present invention will be hereinafter discussed with reference to FIGS. 1 through 6. Each direction described in the following description is defined based on the directions of arrows shown in the drawings.

FIG. 1 shows a vehicle door 10 for opening and closing a side opening of a vehicle body. A sliding glass pane W is installed in a window opening, which is formed between a metal outer panel 11 and a metal door sash 15, to be movable up and down therein.

The upper edge of the outer panel 11, except both the front and rear ends thereof, is formed as a molding mounting portion 12 which extends in the forward/rearward direction and which is formed by bending the upper edge toward the vehicle interior, and both the front and rear ends of the upper edge are formed as pillar connecting portions 13.

The front end (inclined portion) of the door sash 15 is configured of a front pillar 16 while the rear end of the door sash 15 is configured of a rear pillar 17 which extends in the upward/downward direction. The lower ends of the front pillar 16 and the rear pillar 17 are fixed to a vehicle interior-side surface of the outer panel 11 by welding, and the front and rear pillar connecting portions 13 are connected to vehicle exterior-side surfaces of the front pillar 16 and the rear pillar 17 in the vicinity of the lower ends thereof, respectively (see FIGS. 2 and 4; the illustration of the front pillar 16 side is omitted). A mounting hole 18 is formed in the connected portion between the front pillar 16 and the associated pillar connecting portion 13 and another mounting hole 18 is formed in the connected portion between the rear pillar 17 and the associated pillar connecting portion 13. In addition, the upper end of a reinforcing plate 19 is fixed to vehicle interior-side surfaces of the front pillar 16 and the rear pillar 17 by welding.

A belt molding 20 made of resin which extends in the forward/rearward direction is fixed to the upper edge of the outer panel 11. The belt molding 20 is provided with a belt molding body 21 which is formed into a long member extending in the forward/rearward direction, and a front and rear pair of end caps 39 which can be fitted to both the front and rear ends of the belt molding body 21, respectively.

The belt molding body 21, which is a long member obtained by extrusion molding, is provided with a hard base 22 made of a hard resin material (e.g., PP, AES, etc.). The hard base 22 is integrally provided with an upper-end connecting portion 23 which constitutes the upper end of the hard base 22, a vehicle exterior-side portion 24 which extends vertically downward from the vehicle exterior-side edge of the upper-end connecting portion 23, and a vehicle interior-side portion 25 which extends vertically downward from the vehicle interior-side edge of the upper end connecting portion 23. The lower edge of the vehicle interior-side portion 25 is formed as a lower-end engaging lug 26 which projects toward the vehicle exterior, and a contact projection 27 projects from a middle part of the vehicle interior-side portion 25, with respect to the upward/downward direction, to extend toward the vehicle exterior. In addition, the hard base 22 is provided on an inner surface thereof with an engaged portion 28, having the shape of a projection which projects downward from a portion (portion having a curved shape in cross section) of the aforementioned inner surface which extends between the vehicle exterior-side edge of the upper-end connecting portion 23 and the upper edge of the vehicle exterior-side portion 24. Additionally, the vehicle exterior-side portion 24 is provided at the lower edge thereof with a lower-edge projection 29 which projects obliquely upward toward the vehicle interior.

An elastic contact lug 30, which extends toward the vehicle interior and is made of a resin material that is softer than the hard base 22 (e.g., TPO, PVC, etc.), is projected from the vehicle interior-side surface of the vehicle exterior-side portion 24. A vehicle exterior-side lip 31 made of the same material as the elastic contact lug 30 is projected from a lower surface of the lower-edge projection 29, and the outer surfaces of the upper-end connecting portion 23 and the vehicle exterior-side portion 24 are covered with a vehicle external-side covering material 32 which is made of the same material as the elastic contact lug 30. In addition, an upper lip 34 and a lower lip 35, both of which are made of the same material as the elastic contact lug 30 project from the vehicle interior-side surface of the vehicle interior-side portion 25.

Since the belt molding body 21 is molded using extrusion molding as described above, the upper-end connecting portion 23, the vehicle exterior-side portion 24, the vehicle interior-side portion 25, the lower-end engaging lug 26, the contact projection 27, the engaged portion 28, the lower edge projection 29, the elastic contact lug 30, the vehicle exterior-side lip 31, the vehicle external-side covering material 32, the upper lip 34 and the lower lip 35 are located over the entire length of the belt molding body 21 immediately after the completion of the extrusion molding. However, in the present embodiment, by cutting off both the front and rear ends of each of a portion of the upper-end connecting portion 23 which is positioned closer to the vehicle interior-side than a middle part of the upper-end connecting portion 23, the entire part of the vehicle interior-side portion 25 (including the lower-end engaging lug 26 and the contact projection 27), the upper lip 34, and the lower lip 35 after the shape of the belt molding body 21 becomes stable after cooling down sufficiently, the front end faces and the rear end faces of the above-mentioned portion of the upper-end connecting portion 23 on the vehicle interior-side, the entire part of the vehicle interior-side portion 25, the upper lip 34 and the lower lip 35 are formed into front and rear receded end faces 36 which are respectively receded from the front end face and the rear end face of the vehicle exterior-side portion 24 in the lengthwise direction of the belt molding body 21 (see FIGS. 2, 5 and 6; the front receded end face 36 that is positioned on the front-end side of the belt molding body 21 is not shown in the drawings). Additionally, the engaged portion 28 is provided, at the lower edge thereof in the vicinity of both the front and rear ends of the engaged portion 28, with two forward/rearward movement limit recesses 28a, respectively, which are formed by a cutting process performed after the completion of the extrusion molding. The belt molding body 21 that is completed after undergoing the cutting process becomes an anteroposteriorly-symmetrical long member.

The end caps 39 are hard resin products made of the same material as the hard base 22.

Figure 5:
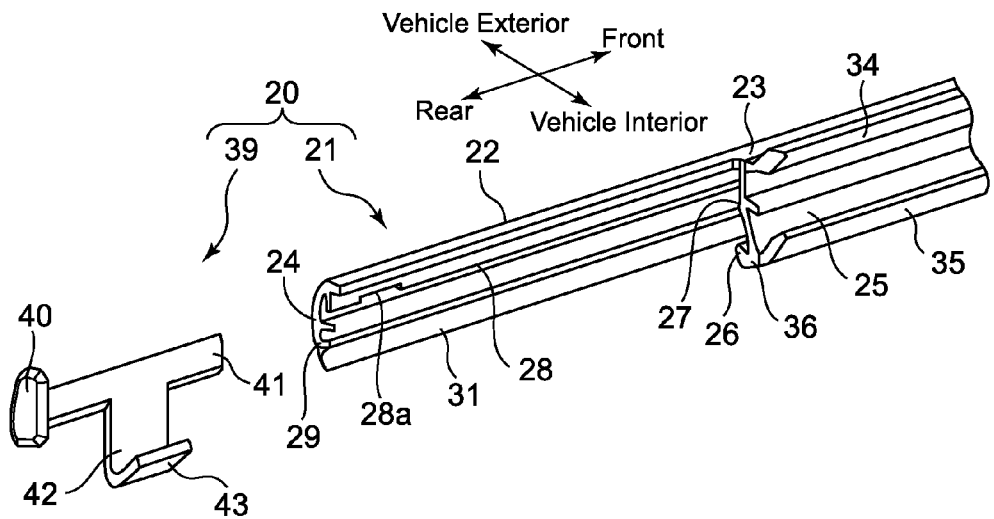
FIG. 5 is an exploded perspective view of the rear of the belt molding body and an end cap, viewed from the vehicle interior-side.
Figure 6:
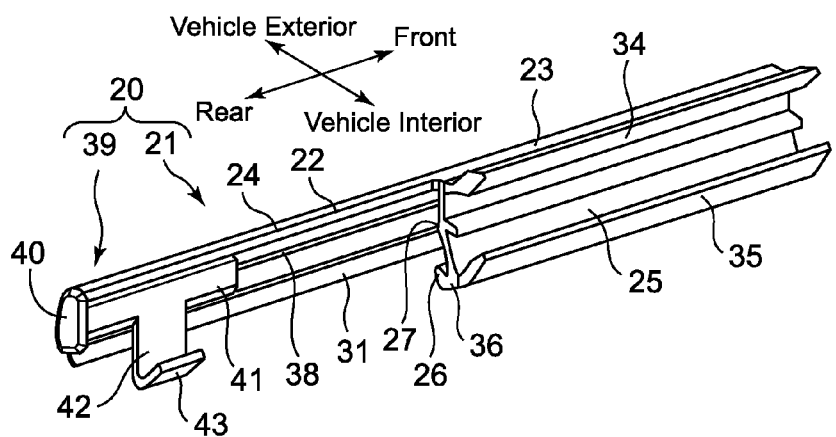
FIG. 6 is a perspective view of the rear of the belt molding, viewed from the vehicle interior-side.

As shown in FIGS. 5 and 6, each end cap 39 (the front end cap 39 and the rear end cap 39 are anteroposteriorly-symmetrical in shape, and hence the front end cap 39 is not shown in the drawings) is provided with a covering end 40 which constitutes the end of the end cap, an insertion portion 41 which extends in the lengthwise direction of the hard base 22, a downward projection 42 which extends downward from the lower edge of the insertion portion 41, a downward movement limit lug 44 which projects obliquely downward from the vehicle exterior-side surface of the insertion portion 41 and an engaging portion 45 which projects toward the vehicle exterior from the vehicle exterior-side surface of the insertion portion 41 and is positioned directly above the downward movement limit lug 44. The downward projection 42 is integrally provided with a vehicle interior-side locking lug 43 which extends obliquely upward toward the vehicle interior from the lower edge of the downward projection 42. The engaging portion 45 is provided with a toward-vehicle-interior movement limit lug 46, having the shape of a protrusion which extends upward from the vehicle exterior-side end of the engaging portion 45, and forward/rearward movement limit lug 47 which extend toward the vehicle interior from the toward-vehicle-interior movement limit lug 46 and have the same anteroposterior dimensions as that of the forward/rearward movement limit recess 28a.

The rear end cap 39 is fitted to the rear end opening of the belt molding body 21 from the rear.

More specifically, the front end of the downward movement limit lug 44 is inserted into the clearance between the lower edge projection 29 and the elastic contact lug 30 from the rear end opening of the belt molding body 21. In addition, the front end of the engaging portion 45 is inserted into the clearance between the engaged portion 28 and the elastic contact lug 30 from the rear end opening of the belt molding body 21, and the toward-vehicle-interior movement limit lug 46 is inserted into the clearance between the vehicle interior-side surface of the vehicle exterior-side portion 24 and the engaged portion 28. Subsequently, the entire end cap 39 is pressed forward until the front surface of the covering end 40 comes into contact with the rear end faces of the upper-end connecting portion 23 and the vehicle exterior-side portion 24. Upon the front surface of the covering end 40 coming into contact with the rear end faces of the upper-end connecting portion 23 and the vehicle exterior-side portion 24, the forward/rearward movement limit lug 47 is engaged in the forward/rearward movement limit recess 28a, so that the end cap 39 is prevented from moving forward and rearward relative to the belt molding body 21. In addition, the end cap 39 is prevented from moving upward and downward relative to the belt molding body 21 because both the upper and lower surfaces of the downward movement limit lug 44 come in contact with the upper surface of the lower edge projection 29 and the lower surface of the elastic contact lug 30, respectively, and the end cap 39 is prevented from moving toward the vehicle exterior relative to the belt molding body 21 because the vehicle exterior-side end of the downward movement limit lug 44 comes in contact with the vehicle interior-side surface of the vehicle exterior-side portion 24. Additionally, the end cap 39 is prevented from moving (coming out) toward the vehicle interior relative to the belt molding body 21 because the vehicle interior-side surface of the towardvehicle-interior movement limit lug 46 comes in contact with the vehicle exterior-side surface of the engaged portion 28.

Although not shown in the drawings, the front end cap 39 can also be fitted to the front end opening of the belt molding body 21 in a similar procedure; upon installation, the front end cap 39 is prevented from moving relative to the belt molding body 21 in the forward/rearward direction, the upward/downward direction, the vehicle exterior-side direction and the vehicle interior-side direction.

When the front and rear end caps 39 are fitted to both the front and rear ends of the belt molding body 21, the front end of the insertion portion 41 of the rear end cap 39 is positioned behind the rear receded end face 36 of the belt molding body 21 (see FIG. 6) and the rear end of the insertion portion 41 of the front end cap 39 is positioned in front of the front receded end face 36 of the belt molding body 21 (not shown). In addition, as viewed in the lengthwise direction of the belt molding 20 (in the forward/rearward direction), the insertion portions 41 of the front and rear end caps 39 are positioned between the vehicle exterior-side portion 24 and the vehicle interior-side portion 25.

The belt molding 20 that is completed by fitting the front and rear pair of end caps 39 to the belt molding body 21 is fixed to the upper edge of the outer panel 11 by placing the belt molding 20, except both the front and rear ends thereof, onto the molding mounting portion 12 of the outer panel 11 from above and inserting the downward projections 42 of the front and rear end caps 39 into the front and rear mounting holes 18.

Figure 3:
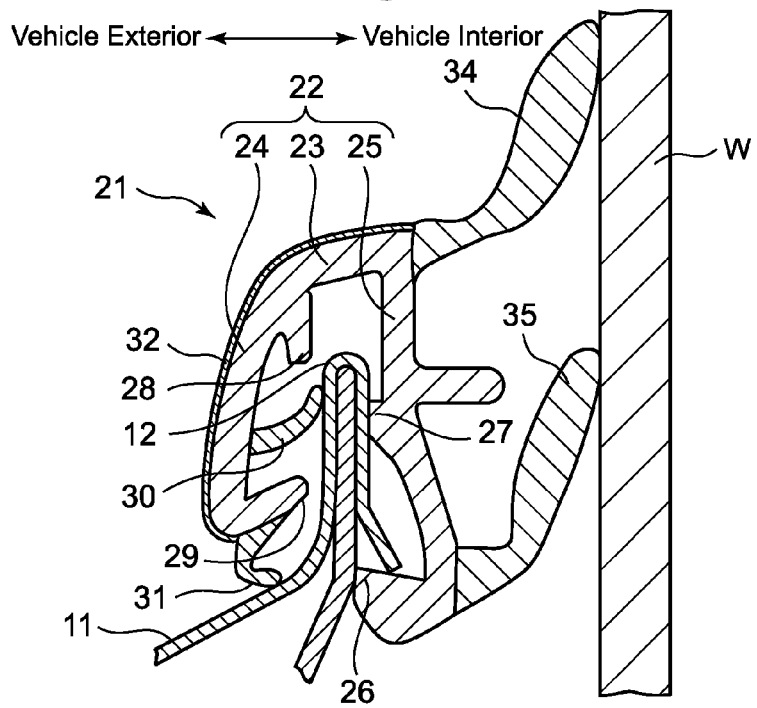
FIG. 3 is a cross sectional view taken along the line III-III shown in FIG. 1 and viewed in the direction of the appended arrows.

Upon the belt molding 20 (the belt molding body 21), except both the front and rear ends thereof, being placed onto the molding mounting portion 12, the upper-end connecting portion 23, except both the front and rear ends thereof, is positioned directly above the molding mounting portion 12, the vehicle exterior-side portion 24, except both the front and rear ends thereof, is positioned on the vehicle external side of the molding mounting portion 12 (faces the molding mounting portion 12 in the direction of the thickness of the vehicle door 10), and the vehicle interior-side portion 25 is positioned on the vehicle interior-side of the molding mounting portion 12 (faces the molding mounting portion 12 in the direction of the thickness of the vehicle door 10) as shown in FIG. 3. Thereupon, the contact projection 27 comes in contact with the molding mounting portion 12 from the vehicle interior-side and the elastic contact lug 30 comes in contact with the molding mounting portion 12 from the vehicle exterior side, so that the belt molding 20 is prevented from moving relative to the molding mounting portion 12 in the direction toward the vehicle exterior and the direction toward the vehicle interior. Additionally, the lower-end engaging lug 26 is engaged with the lower edge of the molding mounting portion 12 on the vehicle interior-side from below, so that the belt molding body 21 is prevented from coming out upwardly, relative to the molding mounting portion 12. In addition, the vehicle exterior-side lip 31 comes into contact with the outer panel 11 while being elastically deformed; additionally, the tips of the upper lip 34 and the lower lip 35 come into contact with the vehicle exterior-side surface of the sliding glass pane W while being elastically deformed when the sliding glass pane W is positioned above the fully opened position (the lower extremity). Additionally, as shown in FIG. 4, the vehicle interior-side locking lug 43 of the downward projection 42 which has entered, through the mounting hole 18, the internal space between the outer panel 11 (the pillar connecting portions 13) and a metal inner panel (not shown) positioned on the vehicle interior-side of the outer panel 11 is engaged with the rear pillar 17 and the reinforcing plate 19 while being elastically deformed, so that the front and rear end caps 39 are prevented from coming out upwardly from the corresponding mounting holes 18.

Figure 4:
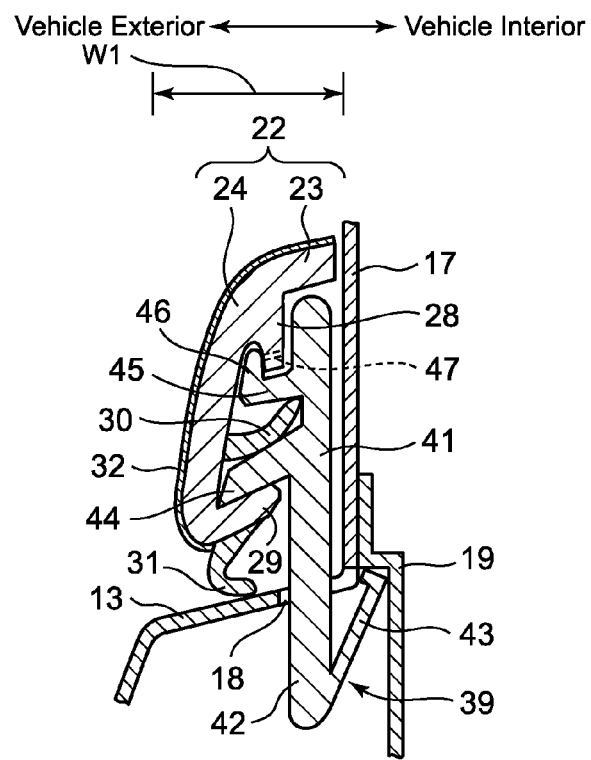
FIG. 4 is a cross sectional view taken along the line IV-IV shown in FIG. 1 and viewed in the direction of the appended arrows.

As shown in FIG. 4, the offset amount between the upper edge of the outer panel 11 and the rear pillar 17 (and the front pillar 16) of the present embodiment of the vehicle door 10 in a vehicle width direction W1 is small. However, since both the front and rear ends of the belt molding body 21 have smaller dimensions in the vehicle width direction than those of conventional belt moldings by cutting off both the front and rear ends of each of a portion of the upper-end connecting portion 23 which is positioned closer to the vehicle interior-side than a middle part of the upper-end connecting portion 23, the entire part of the vehicle interior-side portion 25 (that includes the lower-end engaging lug 26 and the contact projection 27), the upper lip 34, and the lower lip 35, the belt molding 20 can be installed to the outer panel 11 without making the belt molding 20 interfere with the front pillar 16 and the rear pillar 17.

In addition, even though the entire part of the front end and the entire part of the rear end of the vehicle interior-side portion 25 are cut off (do not exist), the end caps 39 do not rattle (move) relative to the belt molding body 21 toward the vehicle interior because the vehicle interior-side surface of the toward-vehicle-interior movement limit lug 46 comes in contact with the vehicle exterior-side surface of the engaged portion 28.

Additionally, since the portion of the inner surface of the hard base 22 which extends between the vehicle exterior-side edge of the upper-end connecting portion 23 and the upper edge of the vehicle exterior-side portion 24 is in the shape of a curved surface in cross section, a shrinkage cavity is easily created at this portion (curved portion) if the belt molding body 21 is formed by extrusion molding. However, in the present embodiment, no shrinkage cavity is outwardly exposed since this portion is provided with the engaged portion 28.

Moreover, both the front and rear ends of the belt molding 20 can be reduced in dimensions in the upward/downward direction compared with the case where the engaged portion 28 is positioned directly above the molding mounting portion 12 because the engaged portion 28 is positioned on the vehicle exterior-side of the molding mounting portion 12.

Although the present invention has been described based on the above illustrated embodiment, the present invention can be implemented with various modifications thereto.

Figure 7:
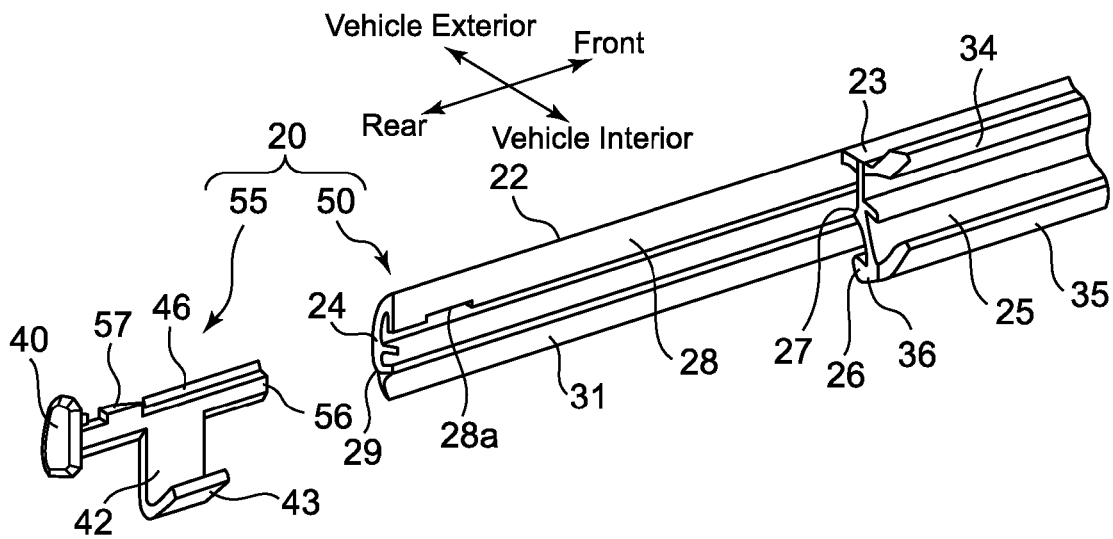
FIG. 7 is a perspective view, similar to that of FIG. 5, of a modified embodiment.
Figure 8:
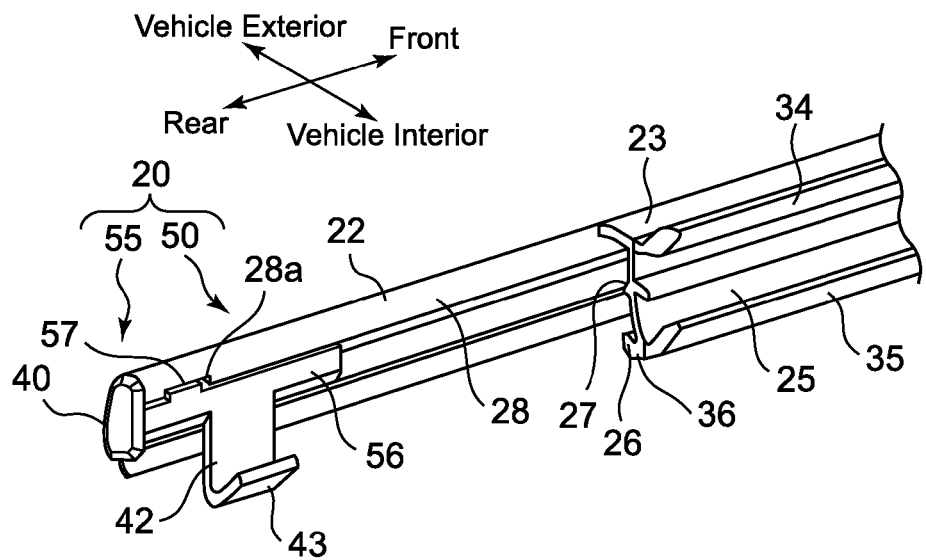
FIG. 8 is a perspective view, similar to that of FIG. 6, of the same modified embodiment.

For instance, the present invention can be practiced in the modified embodiment shown in FIGS. 7 through 9.

A belt molding body 50 in this modified embodiment (portions thereof which are identical in specification or substantially identical in function to those of the belt molding body 21 though slightly different in shape from those of the belt molding body 21 are designated by the same reference numerals as those of the belt molding body 21) is characterized by the major part of the upper-end connecting portion 23 on the vehicle interior-side being cut off, and accordingly, both the front and rear ends of the belt molding body 50 are even smaller in dimensions in the vehicle width direction than those of the belt molding body 21.

In addition, insertion portions 56 of front and rear end caps 55 (portions thereof which are identical in specification or substantially identical in function to those of the end caps 39 though slightly different in shape from those of the end caps 39 are designated by the same reference numerals as those of the end caps 39) each have a shape such that the entire part of a portion corresponding to the upper end of the insertion portion 41 is cut off. Additionally, a forward/rearward movement limit lug 57, which is in the shape of a triangular prism and identical in dimensions in the forward/rearward direction to the forward/rearward movement limit recess 28a, is integrally formed with the upper surface of the insertion portion 56 of each end cap 55, while the engaging portion 45 of the insertion portion 56 of each end cap 55 does not have a portion corresponding to the forward/rearward movement lug 47.

With exception of the forward/rearward movement limit lugs 57 being engaged with the forward/rearward movement limit recesses 28a, the front and rear end caps 55 can be fitted to the belt molding body 50 in the same installing manner as the end caps 39 to the belt molding body 21; upon completion of this installation, the engagement of the forward/rearward movement limit lugs 57 with the forward/rearward movement limit recesses 28a prevents the end caps 55 from moving in the forward/rearward direction relative to the belt molding body 50. In this modified embodiment also, the front end of the insertion portion 56 of the rear end cap 55 is positioned behind the rear receded end face 36 of the belt molding body 50 (see FIG. 8) and the rear end of the insertion portion 56 of the front end cap 55 is positioned in front of the front receded end face 36 of the belt molding body 50 (not shown). In addition, as viewed in the lengthwise direction of the belt molding 20 (in the forward/rearward direction), the insertion portions 56 are positioned between the vehicle exterior-side portion 24 and the vehicle interior-side portion 25.

In this modified embodiment also, the belt molding 20 can be installed to the outer panel 11 of the vehicle door 10 in which the offset amount in the vehicle width direction W1 is small without making the belt molding 20 interfere with the front pillar 16 and the rear pillar 17, and the end caps 55 can be prevented from rattling (moving) relative to the belt molding body 50 toward the vehicle interior by the toward-vehicle-interior movement limit lug 46 and the engaged portion 28. Moreover, since both the front and rear ends of the belt molding body 50 are even smaller in dimensions in the vehicle width direction than those of the belt molding body 21, the belt molding 20 can also be installed to the outer panel 11 of the vehicle door 10 in which the offset amount in the vehicle width direction W1 is even smaller.

In addition, the vehicle exterior-side surface of the engaged portion 28 and the vehicle interior-side surface of the toward-vehicle-interior movement limit lug 46 of each end cap can each be made as a flat surface orthogonal to the vehicle width direction. This configuration increases the engagement force between the engaged portion 28 and the toward-vehicle-interior movement limit lug 46 of each end cap, which makes it possible to more securely prevent the end caps 39 or 55 from rattling relative to the belt molding body 21 or 50 toward the vehicle interior.

Additionally, the engaged portion 28 can be formed to project from the vehicle interior-side surface of the vehicle exterior-side portion 24 (at a position not over the upper-end connecting portion 23) or the inner surface of the upper-end connecting portion 23 (at a position not over the vehicle exterior-side portion 24).

Additionally, it is possible to form the engaged portion 28 into a protrusion extending upward from the vehicle exterior-side portion 24 and form the toward-vehicle-interior movement limit lug 46 of each end cap into a protrusion extending downward from the engaging portion 45 to make the engaging portion 45 engaged into a clearance between the vehicle interior-side surface of the vehicle exterior-side portion 24 and the engaged portion 28.

Additionally, it is possible to cut off only a portion on the vehicle interior-side of one of the front and rear ends of the belt molding body 21 or 50 (to form the front or rear receded end face 36), fit the end cap 39 or 55 to the cut front or rear end, and fit an end cap having a conventional structure to the not-cut end.

Additionally, the engaged portion 28 only needs to be formed on portions facing the toward-vehicle-interior movement limit lugs 46 of the end caps 39, so that a portion of the engaged portion 28 which does not face the toward-vehicle-interior movement limit lugs 46 (a middle part of the belt molding body in the lengthwise direction thereof) can be cut off. Additionally, in the case where only the vehicle interior-side portion of one of the front and rear ends of the belt molding body 21 or 50 is cut off as mentioned above, a portion of the engaged portion 28 on the other end of the belt molding body 21 or 50 can be cut off or remain attached.

INDUSTRIAL APPLICABILITY

The vehicle door belt molding according to the present invention can be narrowed in width in the vehicle width direction at a portion thereof which faces a pillar and can prevent the end cap(s) from rattling toward the vehicle interior even in the case where extrusion molding is used to form the belt molding body.

DESCRIPTION OF THE REFERENCE NUMERALS

10 Vehicle door
11 Outer panel
12 Molding mounting portion (upper edge)
13 Pillar connecting portion
15 Door sash
16 Front pillar
17 Rear pillar
18 Mounting hole
19 Reinforcing plate
20 Belt molding
21 Belt molding body
22 Hard base
23 Upper-end connecting portion
24 Vehicle exterior-side portion
25 Vehicle interior-side portion
26 Lower-end engaging lug
27 Contact projection
28 Engaged portion
28a Forward/rearward movement limit recess
29 Lower edge projection
30 Elastic contact lug
31 Vehicle external side lip
32 Vehicle external side covering material
34 Upper lip
35 Lower lip
36 Receded end face
39 End cap
40 Covering end
41 Insertion portion
42 Downward projection
43 Vehicle interior-side locking lug
44 Downward movement limit lug
45 Engaging portion
46 Toward-vehicle-interior movement limit lug
47 Forward/rearward movement limit lug
50 Belt molding body
55 End cap
56 Insertion portion
57 Forward/rearward movement limit lug
W Sliding glass pane

The invention claimed is:

1. A vehicle door belt molding including a belt molding body shaped into a long member which is fixed to an upper edge of a vehicle door and extends along said upper edge, and an end cap which can be detachably attached to an end-face opening of said belt molding body, wherein a pair of pillars which project upward from said upper edge of said vehicle door are fixed to a vehicle interior-side surface of an outer panel of said vehicle door, said belt molding body comprising:
- a vehicle exterior-side portion which faces said upper edge and said pillars from a vehicle exterior side in a direction of thickness of said vehicle door;
- a vehicle interior-side portion which faces said upper edge from a vehicle interior-side in said direction of thickness of said vehicle door, wherein at least one end face of said vehicle interior-side portion, with respect to a lengthwise direction of said belt molding body, is entirely formed as a receded end face positioned between said pair of pillars; and
- an engaged portion which is formed on an inner surface of said belt molding body and positioned on a vehicle exterior side of said pillars,
- wherein said end cap comprises a covering end which covers an end face of said vehicle exterior-side portion in a same direction as that of said receded end face;
- an insertion portion which extends from said covering end to a point in front of said receded end face and is positioned between said vehicle exterior-side portion and said vehicle interior-side portion as viewed in said lengthwise direction; and
- an engaging portion which is formed on a vehicle exterior-side surface of said insertion portion and engaged with said engaged portion to prevent said end cap from moving toward said vehicle interior-side,
- wherein said engaged portion comprises a protrusion which extends upward or downward from a vehicle interior-side surface of said vehicle exterior-side portion,
- wherein said engaging portion comprises a protrusion which is positioned in a clearance between said vehicle interior-side surface of said vehicle exterior-side portion and said engaged portion to be engaged with a vehicle exterior-side surface of said engaged portion,
- wherein said belt molding body comprises an upper-end connecting portion which is positioned directly above said upper edge and which connects upper edges of said vehicle exterior-side portion and said vehicle interior-side portion to each other, and
- wherein said engaged portion is provided on a curved portion which connects a lower surface of said upper-end connecting portion with said vehicle interior-side surface of said vehicle exterior-side portion.

2. The vehicle door belt molding according to claim 1, wherein said engaged portion comprises a protrusion which extends downward from said vehicle interior-side surface of said vehicle exterior-side portion.

3. The vehicle door belt molding according to claim 1, wherein said engaged portion is positioned closer to said vehicle exterior side than said upper edge of said outer panel.

4. The vehicle door belt molding according to claim 1, wherein said vehicle exterior-side surface of said engaged portion comprises a flat surface orthogonal to a vehicle width direction.

* * * * *